United States Patent
Aldecoa et al.

(10) Patent No.: US 9,883,026 B2
(45) Date of Patent: *Jan. 30, 2018

(54) METHOD AND APPARATUS FOR FACILITATING SPEECH APPLICATION TESTING

(71) Applicant: 24/7 CUSTOMER, INC., Campbell, CA (US)

(72) Inventors: Kioma Valenzuela Aldecoa, Alameda, CA (US); Amul Adagale, Alameda, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/235,020

(22) Filed: Aug. 11, 2016

(65) Prior Publication Data

US 2016/0352892 A1 Dec. 1, 2016

Related U.S. Application Data

(63) Continuation of application No. 14/938,832, filed on Nov. 11, 2015, now Pat. No. 9,444,935.

(60) Provisional application No. 62/078,885, filed on Nov. 12, 2014.

(51) Int. Cl.
| | |
|---|---|
| *H04M 1/24* | (2006.01) |
| *H04M 3/22* | (2006.01) |
| *H04M 3/493* | (2006.01) |
| *G10L 15/01* | (2013.01) |

(Continued)

(52) U.S. Cl.
CPC ......... *H04M 3/2236* (2013.01); *G10L 13/033* (2013.01); *G10L 15/01* (2013.01); *H04M 3/4936* (2013.01); *H04M 3/5166* (2013.01)

(58) Field of Classification Search
CPC .................................................. H04M 3/2236
See application file for complete search history.

(56) References Cited

U.S. PATENT DOCUMENTS

| | | | | |
|---|---|---|---|---|
| 6,067,514 A | * | 5/2000 | Chen | G10L 15/18 704/235 |
| 6,356,867 B1 | * | 3/2002 | Gabai | G06F 9/45512 704/235 |

(Continued)

*Primary Examiner* — Joseph T Phan
(74) *Attorney, Agent, or Firm* — Perkins Coie LLP

(57) ABSTRACT

A computer-implemented method and an apparatus for facilitating speech application testing generate a plurality of test scripts. A test script is generated by initiating a voice call interaction with a speech application including a network of interaction nodes, and repeatedly performing, until a stopping condition is encountered, the steps of, executing the voice call interaction by traversing through interaction nodes until an interaction node requiring a response is encountered, selecting an utterance generation mode, determining a response to be provided corresponding to the interaction node, and providing the response to the speech application. The test script comprises instructions for traversing interaction nodes and for provisioning one or more responses during the course of the voice call interaction. One or more test scripts from among the plurality of test scripts are identified based on a pre-determined objective and provided to a user for facilitating testing of the speech application.

20 Claims, 7 Drawing Sheets

(51) Int. Cl.
   *G10L 13/033* (2013.01)
   *H04M 3/51* (2006.01)

(56) References Cited

U.S. PATENT DOCUMENTS

| | | | |
|---|---|---|---|
| 6,477,492 B1 * | 11/2002 | Connor | G10L 25/69 379/1.02 |
| 7,346,507 B1 | 3/2008 | Natarajan et al. | |
| 2003/0187639 A1 | 10/2003 | Mills et al. | |
| 2003/0212561 A1 | 11/2003 | Williams et al. | |
| 2006/0224392 A1 | 10/2006 | Kershaw et al. | |
| 2008/0127124 A1 | 5/2008 | Gilfix et al. | |
| 2008/0221896 A1 | 9/2008 | Cai et al. | |
| 2008/0304650 A1 | 12/2008 | Catlin et al. | |
| 2009/0043576 A1 | 2/2009 | Miller et al. | |
| 2009/0265681 A1 | 10/2009 | Beto et al. | |
| 2012/0020466 A1 | 1/2012 | Dunsmuir et al. | |

* cited by examiner

METHOD AND APPARATUS FOR FACILITATING SPEECH APPLICATION TESTING

CROSS REFERENCE TO RELATED APPLICATIONS

This application is a continuation of U.S. patent application Ser. No. 14/938,832, filed Nov. 11, 2015, which claims priority to U.S. provisional patent application Ser. No. 62/078,885, filed Nov. 12, 2014, each of which is incorporated herein in its entirety by this reference thereto.

TECHNICAL FIELD

The invention generally relates to speech applications and more particularly, to a method and apparatus for testing of speech applications.

BACKGROUND

Speech applications are designed to respond to spoken human speech and are increasingly being used in a variety of applications. For example, a speech application embodied as an interactive voice response (IVR) application may help users in obtaining answers to their queries, in procuring information related to products and services, in making payments, in lodging complaints, and in general in receiving assistance for a variety of purposes.

The speech applications need to be periodically tested, as the speech applications are prone to errors. However, speech applications pose several testing challenges. For example, comprehensive testing of a speech application requires simulating realistic human speech, including triggering different recognition confidence levels and testing true spoken speech with spoken accents that match expected user usage. Further, many speech applications support multiple human languages, thereby necessitating translation of utterances/prompts, which is often a challenge. In some example scenarios, the speech applications involve multiple iterations thereby requiring changes to grammars and prompts.

In some example scenarios, detecting errors in speech applications may also be difficult, as distinguishing between known and expected behavior requires cross-referencing multiple documents. Further, determining which specific spoken utterances produced specific actions, involves analyzing complex grammars, and as such, determining valid test data is often a time consuming process.

Conventional techniques for manual speech application testing are slow, prone to errors, inefficient at reproducing failures and require substantial human effort to analyze, translate and test the speech applications. Some conventional techniques make use of automated test scripts to increase the speed of testing. However, building test scripts that provide adequate test coverage is a time-consuming and expensive proposition. Moreover, considerable effort is required to regularly update the test scripts as per changes to the speech applications.

SUMMARY

In an embodiment of the invention, a computer-implemented method for facilitating testing of a speech application includes generating, by a processor, a plurality of test scripts. A test script from among the plurality of test scripts is generated by initiating a voice call interaction with a speech application. The speech application includes a network of interaction nodes. The method further repeatedly performs, until a stopping condition is encountered, the steps of, executing the voice call interaction with the speech application by traversing through one or more interaction nodes from among the network of interaction nodes until an interaction node requiring a response is encountered; selecting an utterance generation mode corresponding to the interaction node; determining a response to be provided corresponding to the interaction node of the speech application based on the utterance generation mode; and providing the response to the speech application. The generated test script comprises instructions for traversing interaction nodes involved during a course of the voice call interaction, and, instructions for provisioning one or more responses to the speech application during the course of the voice call interaction. The method identifies, by the processor, one or more test scripts from among the plurality of test scripts based on a pre-determined objective. The method provides, by the processor, the one or more test scripts to a user for facilitating testing of the speech application.

In another embodiment of the invention, an apparatus for facilitating testing of speech applications includes at least one processor and a memory. The memory stores machine executable instructions therein, that when executed by the at least one processor, cause the apparatus to generate a plurality of test scripts. A test script from among the plurality of test scripts is generated by initiating a voice call interaction with a speech application. The speech application includes a network of interaction nodes. The apparatus further repeatedly performs, until a stopping condition is encountered, the steps of, executing the voice call interaction with the speech application by traversing through one or more interaction nodes from among the network of interaction nodes until an interaction node requiring a response is encountered; selecting an utterance generation mode corresponding to the interaction node; determining a response to be provided corresponding to the interaction node of the speech application based on the utterance generation mode; and providing the response to the speech application. The generated test script comprises instructions for traversing interaction nodes involved during a course of the voice call interaction, and, instructions for provisioning one or more responses to the speech application during the course of the voice call interaction. The apparatus identifies one or more test scripts from among the plurality of test scripts based on a pre-determined objective. The apparatus provides the one or more test scripts to a user for facilitating testing of the speech application.

In another embodiment of the invention, a non-transitory computer-readable medium storing a set of instructions that when executed cause a computer to perform a method for facilitating a testing of a speech application is disclosed. The method executed by the computer generates a plurality of test scripts. A test script from among the plurality of test scripts is generated by initiating a voice call interaction with a speech application. The speech application includes a network of interaction nodes. The method further repeatedly performs, until a stopping condition is encountered, the steps of, executing the voice call interaction with the speech application by traversing through one or more interaction nodes from among the network of interaction nodes until an interaction node requiring a response is encountered; selecting an utterance generation mode corresponding to the interaction node; determining a response to be provided corresponding to the interaction node of the speech application based on the utterance generation mode; and providing the response to the speech application. The generated test script comprises instructions for traversing interaction nodes involved during a course of the voice call interaction, and, instructions for provisioning one or more responses to the speech application during the course of the voice call interaction. The method identifies one or more test scripts from among the plurality of test scripts based on a predetermined objective. The method provides the one or more test scripts to a user for facilitating testing of the speech application.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
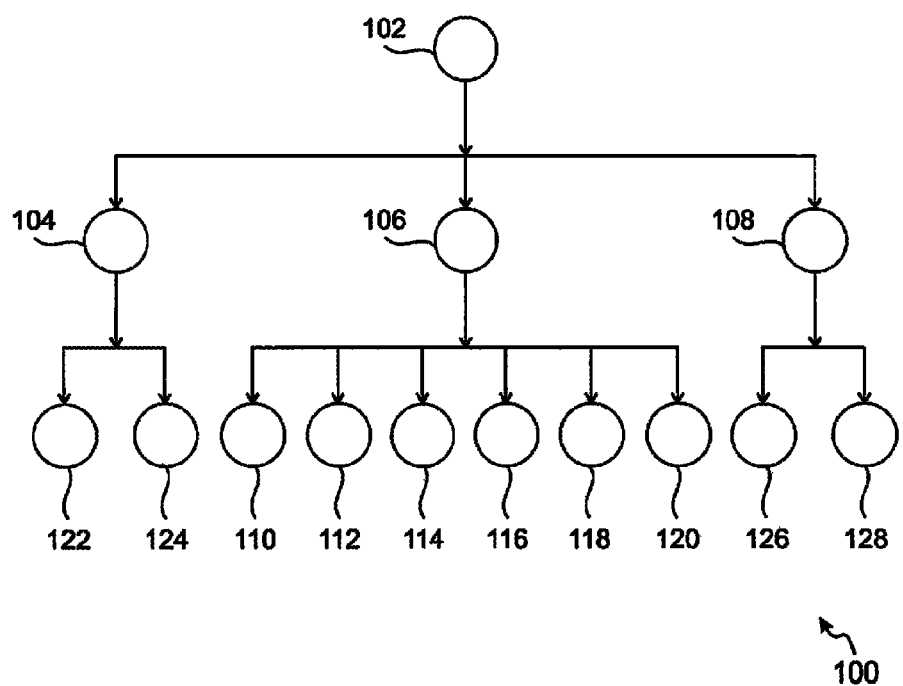
FIG. 1 shows an example representation of a speech application, in accordance with an example scenario.

FIG. 1 shows an example representation 100 of a speech application, in accordance with an example scenario. The term 'speech application' as used herein refers to a voice based application or a machine-based voice response system that simulates an individual, for example a customer support representative or a virtual agent, and that is configured to interact with users with an aim to provide assistance to the users based on their respective requirements.

In an example scenario, a typical interaction with a speech application may follow multiple sequential paths (or journeys) and as such each sequential path or journey may involve decision options or nodes, which advance the interaction from one step to another. The nodes along multiple possible sequential paths are collectively referred to herein as interaction nodes. As an illustrative example, the example representation 100 depicts the speech application to include several interaction nodes, such as interaction nodes 102, 104, 106, 108, 110, 112, 114, 116, 118, 120, 122, 124, 126 and 128. In at least one example scenario, the various interaction nodes of the speech application may be interconnected based on various possible sequential paths so as to configure a network of interaction nodes. In the example representation 100, the interaction nodes of the speech application are depicted to be hierarchically ordered to facilitate interaction with the users in an efficient manner. It is noted that the example representation 100 depicting a hierarchy of interaction nodes is shown herein for illustration purpose and the network of interaction nodes of the speech application may not be limited to a hierarchical arrangement of interaction nodes. Indeed various possible arrangements of the network of interaction nodes may be structured for configuring the multiple sequential paths for furthering an interaction between a user and the speech application. For example, in some scenarios, the interaction node 106 in the example representation 100 may be directly connected to interaction nodes 122 and 126, or, some scenarios, at least one interaction node from among the interaction nodes 122 to 128 may directly be connected to a top interaction node, such as the interaction node 102, and the like, to configure the network of interaction nodes.

In an illustrative example, the speech application may be implemented as an interactive voice response (IVR) application configured to assist users, such as for example users of a banking enterprise with their queries. In an example scenario, a top interaction node of the IVR application, for example interaction node 102, may correspond to an initial point in an interaction when a welcome message is provisioned to a user wishing to communicate with the IVR application. Thereafter, the user may be provisioned with a dialog prompt listing several categories and the user may be requested to choose a category related to his/her query. In an illustrative example, the user may provide spoken input to choose a category from among a 'banking accounts' category, a 'cards category' and a 'loyalty program' category. In an illustrative example, the interaction with the IVR application may advance to the interaction node 104 upon selection of the banking accounts category, to the interaction node 106 upon selection of the cards category or to the interaction node 108 upon selection of the rewards category. The dialog prompts offered to the user at the interaction nodes 104, 106, 108 and the corresponding spoken input received from the user may further the interaction to another interaction node from among interaction nodes 110-128. For example, the user may be offered to choose a category from among categories related to 'Missing card', 'Card not working', 'New card application', 'New card activation', 'Dispute charge', 'Payment arrangements' or 'Need replacement card' at the interaction node 106, and the user's spoken input may further the interaction with the IVR application to an interaction node 110, 112, 114, 116, 118 or 120. Similarly, the user's spoken input at the interaction node 104 may further the interaction to one of the interaction nodes 122 and 124, whereas the user's spoken input at the interaction node 108 may further the interaction to one of the interaction nodes 126 and 128. The interaction may proceed in such a manner until one of a resolution of user query, a termination of the interaction or a transfer of the interaction to a human agent is realized.

It is understood that an implementation of the speech application as an IVR application is described herein for illustration purposes and that the speech application may be implemented in various forms to suit a variety of requirements. For example, the speech application may be embodied as a voice-based assistant deployed in a communication device, such as a Smartphone device, and configured to receive voice commands from a user of the communication device and provide appropriate responses. An example user interaction with a speech application is explained with reference to FIG. 2.

Figure 2:
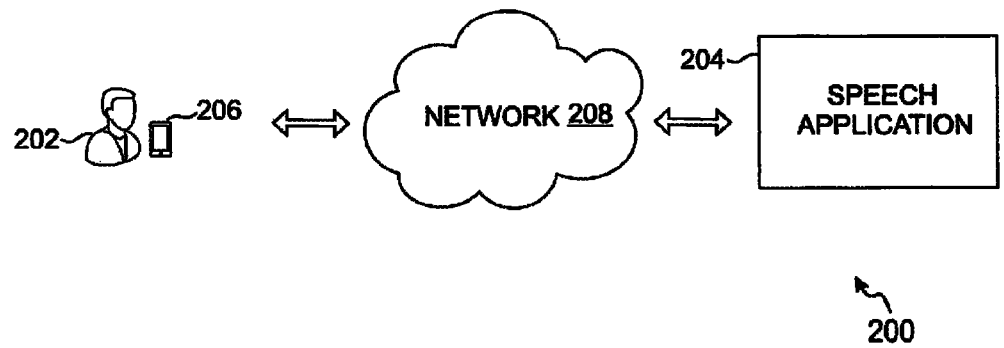
FIG. 2 depicts an example representation of a user interacting with a speech application, in accordance with an example scenario.

FIG. 2 depicts an example representation 200 of a user 202 interacting with a speech application 204, in accordance with an example scenario. The user 202 is associated with a communication device 206. The communication device 206 is capable of facilitating user communication with the speech application 204 over a network 208. Examples of the communication device 206 may include a mobile phone, a Smartphone, a tablet personal computer, a laptop, a personal computer, a wearable device and the like. Examples of the network 208 may include wired networks, wireless networks or a combination thereof. Examples of wired networks may include Ethernet, local area network (LAN), fiber-optic cable network and the like. Examples of wireless networks may include cellular networks like GSM/3G/4G/CDMA networks, wireless LAN, Bluetooth or Zigbee networks and the like. An example of a combination of wired and wireless networks may include the Internet.

In an example scenario, the speech application 204 may be deployed in a Web server from among a plurality of Web servers disposed on the network 208. As explained with reference to FIG. 1, in some scenarios, the speech application 204 may be implemented as an IVR application associated with a customer sales and support (CSS) center related to an enterprise, such as for example a banking enterprise. The speech application 204 in such a scenario may be deployed in a Web server related to the banking enterprise. The user 202 may utilize the communication device 206 to contact the CSS center and may be directed to the speech application 204 deployed therein. Further, as explained with reference to FIG. 1, the speech application 204 may be configured to provide a dialog prompt including a welcome message, such as for example, 'Welcome to MNO Bank, how can we help you today?' to the user 202 upon being contacted by the user 202. In an example scenario, the user 202 may respond with a query, for example, 'I need to know the available balance in my savings account'. The speech application 204 may be configured to interpret the spoken human speech and respond with a dialog prompt including an instruction stating 'Please input your savings account number followed by the hash sign'. The user 202 may thereafter input the savings account number using a keypad associated with the communication device 206 and press the hash sign upon completion of the corresponding input. The speech application 204 may then verify the authenticity of the user 202 and thereafter seek to provide information related to available balance in the user's savings bank account. For such purposes, the speech application 204 may be communicably associated with one or more external applications. For example, the speech application 204 may be communicably associated with a banking application related to the banking enterprise. The banking application may be configured to provide information related to the user's savings bank account to the speech application 204, which may then relay the information to the user 202.

It is noted that although the speech application 204 is explained herein to be deployed in a Web server disposed on the network 208, in various example scenarios, the speech application 204 may be deployed in the communication device 206 as a voice assistant configured to be responsive to voice commands. For example, the speech application 204 may be configured to receive voice commands like 'what is the current temperature' or 'How far is Monterey Bay from here' and provide appropriate responses to queries from the user 202.

The speech applications, such as the speech application 204, need to be periodically tested, as the speech applications are prone to errors. Some conventional speech application testing procedures may involve deploying the speech application in a test environment and manually interacting with the speech application as a normal person would. Such an approach for speech application testing is slow and error-prone, and when a failure is discovered, it is difficult to reproduce the exact test scenario. In some example scenarios, the speech application is run in an interactive text-based environment. This requires human effort to analyze the speech application and the corresponding documentation, and perform testing, and is thus slow, expensive, and error-prone. Some conventional approaches involve creation of test scripts that execute in the interactive text-based environment. The term 'test script' as used herein refers to set of instructions for the purpose of testing different interaction nodes or dialog states in the speech application. Test scripts can speed up testing efforts by allowing suites of tests to be run against a speech application in an automated manner. However, building test scripts that provide adequate coverage is a time-consuming and expensive proposition. Moreover, considerable effort is required to regularly update the test scripts as per changes to the speech applications.

Various embodiments of the present technology provide methods and apparatuses that are capable of overcoming these and other obstacles and providing additional benefits. More specifically, various embodiments of the present technology disclosed herein facilitate in testing of speech applications. The methods and apparatuses disclosed herein enable testing of the speech applications with minimal human intervention regardless of speech application design changes and/or changes to integration of external applications. In some example embodiments, the methods and apparatuses disclosed herein provide a minimal set of test scripts that are configured to optimally cover testing of a maximum number of interaction nodes in a speech application. An apparatus for facilitating testing of the speech applications is explained with reference to FIG. 3

Figure 3:
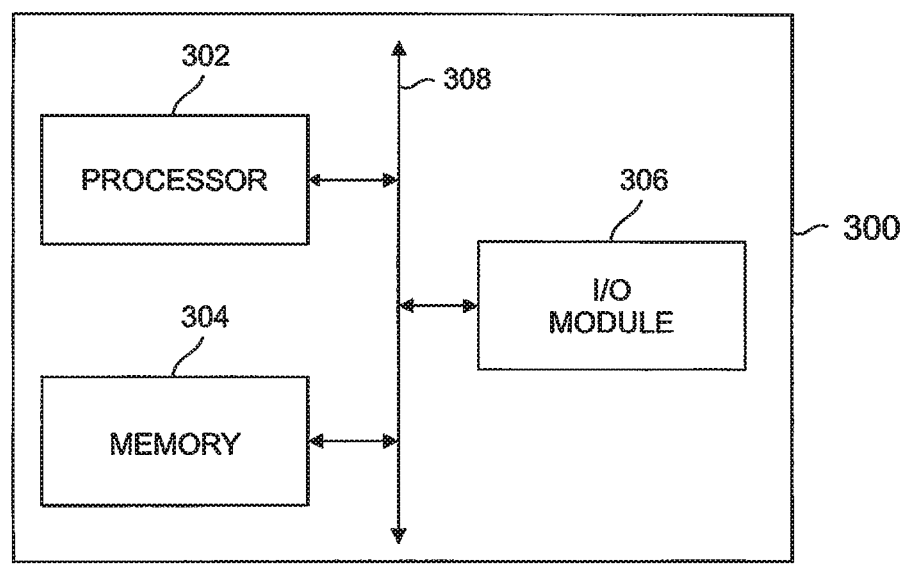
FIG. 3 is a block diagram showing an example apparatus configured to facilitate testing of speech applications, in accordance with an embodiment of the invention.

FIG. 3 is a block diagram of an example apparatus 300 configured to facilitate testing of speech applications, in accordance with an embodiment of the invention. In at least one example embodiment, the apparatus 300 is configured to provide simulated speech utterances to a speech application and receive corresponding spoken responses from the speech application for facilitating testing of the speech application. In an example embodiment, the apparatus 300 may be included in a web-based platform, such as a test server, and may be communicably associated with an application server hosting one or more speech applications for testing the speech applications included therein. In another embodiment, the apparatus 300 may be communicably associated with one or more communication devices including speech applications for facilitating testing of the speech applications.

The apparatus 300 includes at least one processor, such as a processor 302 and a memory 304. It is noted that although the apparatus 300 is depicted to include only one processor, the apparatus 300 may include more number of processors therein. In an embodiment, the memory 304 is capable of storing machine executable instructions. Further, the processor 302 is capable of executing the stored machine executable instructions. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard-coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The apparatus 300 also includes an input/output module 306 (hereinafter referred to as 'I/O module 306') for providing an output and/or receiving an input. The I/O module 306 is configured to be in communication with the processor 302 and the memory 304. Examples of the I/O module 306 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions, for example, software and/or firmware, stored on a memory, for example, the memory 304, and/or the like, accessible to the processor 302. In an embodiment, the I/O module 306 may be configured to provide a user interface (UI) capable of enabling enterprises to utilize the apparatus 300 for testing of enterprise services. Furthermore, the I/O module 306 may be configured to be integrated with a monitoring system to provide continuous testing of live production applications.

In at least one example embodiment, the I/O module 306 is further configured to interface with a platform of the speech application to allow programmatic access to the speech application. In an embodiment, the I/O module 306 may provide access to a grammar of the speech application (hereinafter referred to as speech application grammar) in addition to the text of the dialog prompts associated with various interaction nodes of the speech application. For example, consider a dialog prompt 'Welcome to MNO Bank, how can we help you today?', associated with an interaction node of the speech application. Such a dialog prompt may elicit a response in form of spoken input from a user. In order to understand, the user's spoken response, the speech application may be associated with grammar, i.e., a structured list of rules that identify words or phrases in the spoken input to match spoken speech utterances with machine-usable interpretations. For example, a grammar rule may be defined to interpret an occurrence of two words 'bill' and 'due' fairly closely to each other in a conversation to be related to a bill payment category. Such a determination of machine-usable interpretation may then be used by the speech application to provide an appropriate response to a user. The I/O module 306 may be configured to provide access to the dialog prompts and corresponding speech application grammar on a node-by-node basis (i.e., access to dialog prompt and speech application grammar corresponding to an interaction node is provided upon encountering the interaction node during a voice call interaction) or access to such information is provisioned for all the interaction nodes of the speech application, collectively, in one-go. Further, in some embodiments, the I/O module 306 may be configured to assist in programmatically supplying spoken utterance (i.e. spoken input) with a specific confidence, or reading a prompt from the speech application that represents spoken text.

In an embodiment, various components of the apparatus 300, such as the processor 302, the memory 304 and the I/O module 306 are configured to communicate with each other via or through a centralized circuit system 308. The centralized circuit system 308 may be various devices configured to, among other things, provide or enable communication between the components (302-306) of the apparatus 300. In certain embodiments, the centralized circuit system 308 may be a central printed circuit board (PCB) such as a motherboard, main board, system board, or logic board. The centralized circuit system 308 may also, or alternatively, include other printed circuit assemblies (PCAs) or communication channel media.

It is understood that the apparatus 300 as illustrated and hereinafter described is merely illustrative of an apparatus that could benefit from embodiments of the invention and, therefore, should not be taken to limit the scope of the invention. It is noted that the apparatus 300 may include fewer or more components than those depicted in FIG. 3. Moreover, the apparatus 300 may be implemented as a centralized apparatus, or, alternatively, the various components of the apparatus 300 may be deployed in a distributed manner while being operatively coupled to each other. In another embodiment, the apparatus 300 may be embodied as a mix of existing open systems, proprietary systems and third party systems. In another embodiment, the apparatus 300 may be implemented completely as a set of software layers on top of existing hardware systems. In an exemplary scenario, the apparatus 300 may be any machine capable of executing a set of instructions (sequential and/or otherwise) so as to facilitate testing of speech applications.

In an embodiment, the processor 302 is configured to, with the content of the memory 304, cause the apparatus 300 to execute a test run involving multiple cycles of testing (also referred to herein as test cycles) of a speech application. The term 'test cycle' as used herein refers to a single voice call interaction with a speech application executed with an intention of testing a response of the speech application to spoken utterances provided to the speech application. The apparatus 300 is configured to execute multiple such test cycles in each test run. As explained with reference to FIG. 1, a speech application may be associated with a network of interaction nodes. The execution of each test cycle by the apparatus 300 may involve initiating a voice call interaction with a speech application and interacting with interaction nodes of the speech application until a stopping condition is encountered. In an embodiment, the stopping condition may be one of (1) an error event indicative of detection of at least one error (such as for example, an error related to spoken utterance not understood by the speech application, or an error related to the speech application not being able to traverse to a next interaction node, or even a speech application programming error, etc.); (2) an interaction transfer event indicative of detection of a transfer of the voice call interaction to a customer support representative, such as a human agent or a virtual agent; (3) an interaction termination event indicative of detection of termination of the voice call interaction; and (4) a goal realization event indicative of detection of a realization of a pre-determined goal for testing of the speech application. Some non-limiting examples of the pre-determined goal for testing of the speech application may include a test coverage goal related to ensuring maximum coverage of interaction nodes of the speech application during testing of the speech application or a goal related to reaching a specific interaction node using least number of interaction steps or even a goal related to reproducing a specific error, and the like.

Accordingly, the processor 302 in conjunction with the I/O module 306 may be configured to initiate the voice call interaction with the speech application. Thereafter, the processor 302 may be configured to execute the speech application until an interaction node requiring a response (such as for example, an interaction node associated with a dialog prompt, which elicits a response from the processor 302 simulating an input from a user) is encountered. The processor 302 in conjunction with the memory 304 may provide an input to meet the response requirement of the interaction mode. The steps of executing the speech application until an interaction node requiring a response is encountered and providing the appropriate response may be repeatedly performed by the processor 302 until a stopping condition (such as for example, an error event, an interaction transfer event, an interaction termination event or a goal realization event, as explained above) is encountered.

In an embodiment, the processor 302 is configured to, with the content of the memory 304, cause the apparatus 300 to generate a test script corresponding to each test cycle. As explained with reference to FIG. 2, the term 'test script' refers to a set of instructions for the purpose of testing different interaction nodes or dialog states in the speech application. Accordingly, upon execution of a test cycle, the processor 302 is configured to generate a set of instructions which outline steps to recreate the voice call interaction with the speech application. Accordingly, the generated test script includes a set of instructions for reaching interaction nodes, which were encountered during the respective voice call interaction and instructions for providing responses to interaction nodes associated with response requirement. In an embodiment, the processor 302 may run multiple test cycles until adequate test coverage (for example, testing of a target number of interaction nodes etc.) is achieved and/or until a pre-defined limit, such as for example a maximum of test runs/cycles, is reached.

As explained, a test script is generated corresponding to each test cycle. Accordingly, a test run involving multiple test cycles, therefore, generates a plurality of test scripts. In an embodiment, the processor 302 is configured to store test scripts that allow reproduction of test steps/inputs that capture responses (for example, utterances and other inputs) in the memory 304. The testing of speech applications is further explained with reference to flow diagrams in FIGS. 4 to 7. An example test run executed by the apparatus 300 is explained with reference to FIG. 4.

Figure 4:
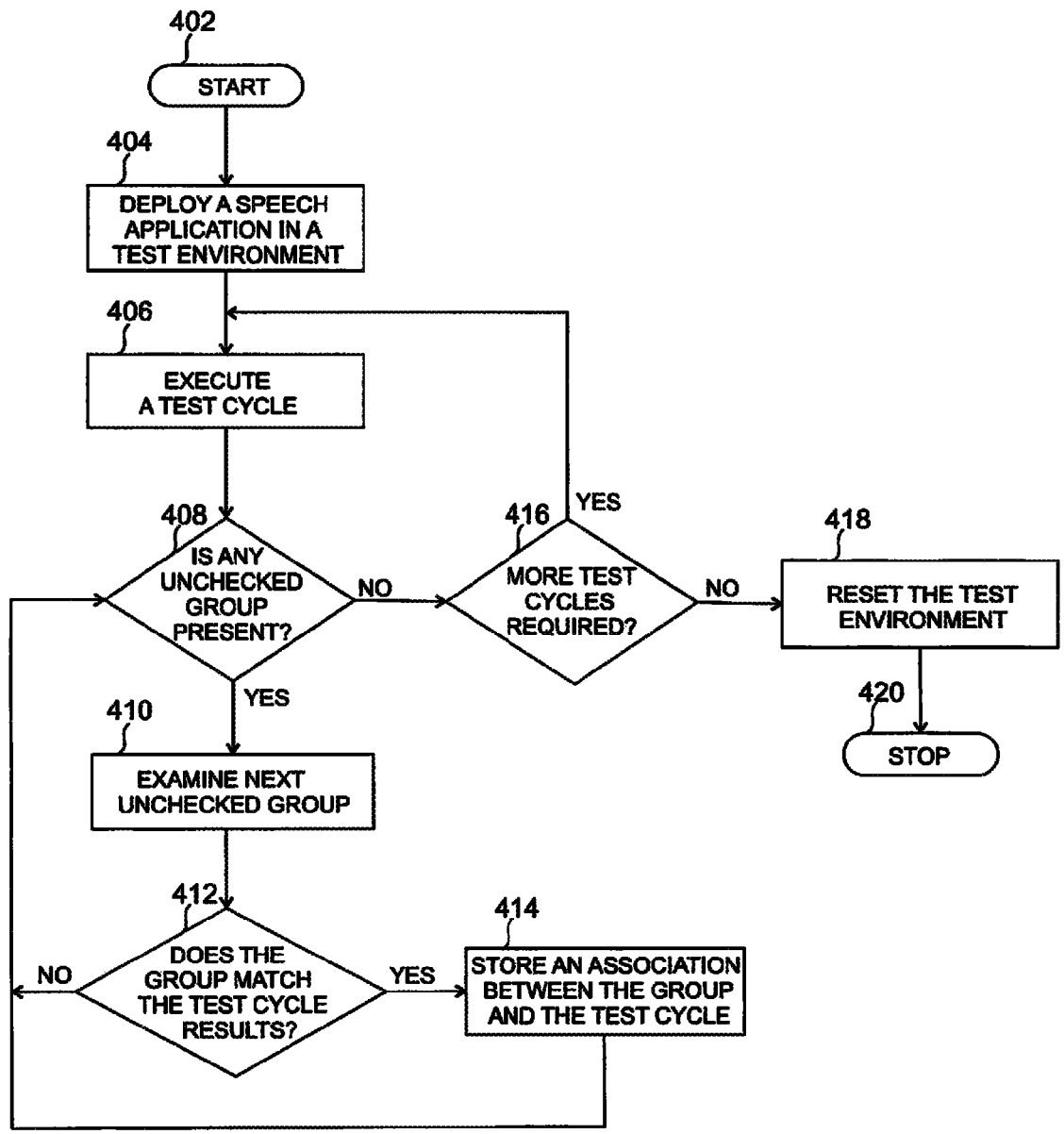
FIG. 4 is a flow diagram of a method illustrating an example test run executed by the apparatus of FIG. 3 for facilitating testing of a speech application, in accordance with an embodiment of the invention.

FIG. 4 is a flow diagram of a method 400 illustrating an example test run executed by the apparatus 300 for facilitating testing of a speech application in accordance with an embodiment of the invention. The method 400 starts at operation 402. At operation 404, the speech application is deployed in the test environment, or more specifically, an interaction is initiated between the speech application and the apparatus 300 (for example, using the I/O module 306 as explained with reference to FIG. 3). At operation 406, a test cycle is executed (for example, by the processor 302 in conjunction with the memory 304). The execution of the test cycle is explained later with reference to FIG. 5.

In an embodiment, test cycles executed previously (i.e., test cycles executed prior to the execution of the current test cycle) are pooled into different groups by the processor 302 of the apparatus 300 based on presence of commonality or a pattern in corresponding test cycle results. For example, all test cycles in which one or more 'error messages' are logged configure a 'logged error group'. In another illustrative example, all test cycles that involve a particular node, for example Node XYZ, configure a 'node XYZ group'. In some example scenarios, all test cycles for which no particular pattern or commonality could be identified yet, may also configure a separate group. It is understood that defining groups and pooling test cycle results in the defined groups may enable a user to identify test cycles that are capable of reproducing specific scenarios (for example, reproduce specific errors or enable testing of specific nodes and the like). In an embodiment, upon execution of the test cycle, the test cycle results are compared with a plurality of predefined groups to determine if the test cycle results match with the test cycle results pooled in the plurality of pre-defined groups. At operation 408, it is determined if one or more groups are left unchecked. If it is determined that one or more groups are left unchecked then at operation 410, an unchecked group is examined. Subsequently, at operation 412, it is determined whether the group matches the test cycle results. If the group matches the test cycle results, then at operation 414, an association between the group and the test cycle is stored (for example in the memory 304 of the apparatus 300). More specifically, the test cycle results may be pooled in the group including other similar test cycle results in order to establish the association between the group and the test cycle results. If the group does not match the test cycle results, then operations from operation 408 onwards are repeated until an examining of all unchecked groups is completed.

If association of the test cycle results with all pre-defined groups is checked, then it is determined whether more test cycles are required at operation 416. As explained with reference to FIG. 3, the processor 302 may run multiple test cycles until adequate test coverage is achieved and/or until a pre-defined limit is reached. Accordingly, at operation 416, the processor 302 of the apparatus 300 may determine if adequate test coverage is achieved or a pre-defined limit is reached in order to determine whether more test cycles are required or not. If it is determined that more test cycles are required at operation 416, then operations from 406 onwards are repeated until it is determined that no more test cycles are required at operation 416. At operation 418, the test environment is reset, i.e. the interaction between the speech application and the apparatus 300 is discontinued and data related to the test cycles (for example, data related to interaction nodes traversed, spoken utterances provided etc.) is recorded. The method 400 stops at operation 420. The execution of the test cycle at operation 406 is explained hereinafter with reference to FIG. 5.

Figure 5:
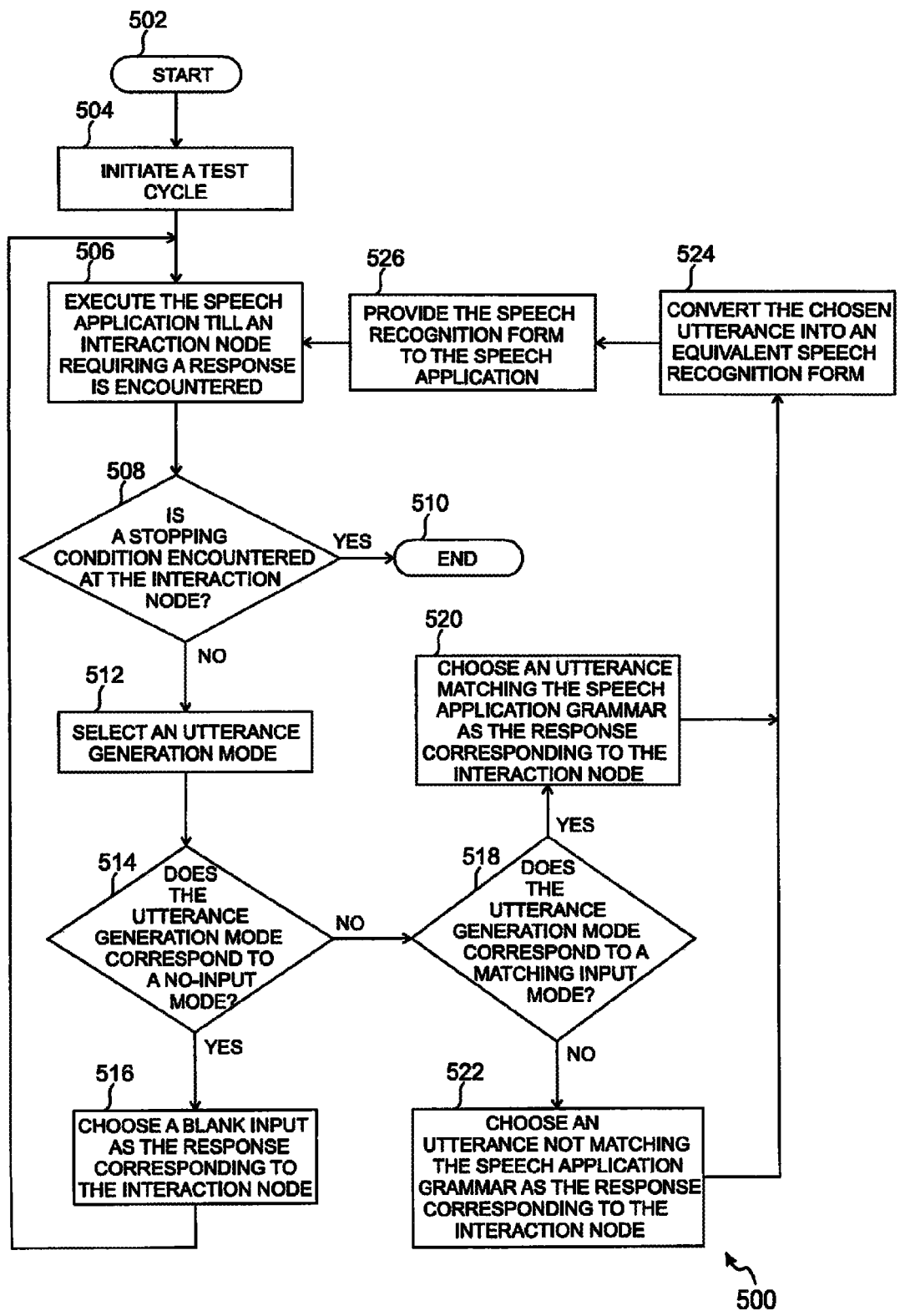
FIG. 5 is a flow diagram of a method illustrating an example test cycle executed by the apparatus of FIG. 3 for facilitating testing of a speech application, in accordance with an embodiment of the invention.

FIG. 5 is a flow diagram of a method 500 illustrating an example test cycle executed by the apparatus 300 for facilitating testing of a speech application in accordance with an embodiment of the invention. The method 500 starts at operation 502. At operation 502, the speech application is deployed in a test environment. At operation 504, the test cycle is initiated (or more specifically, an interaction is initiated between the speech application and the apparatus 300 as explained with reference to operation 504 in method 500). At operation 506, the speech application is executed by traversing through one or more interaction nodes from among the network of interaction nodes until an interaction node requiring a response is encountered. As explained with reference to FIG. 3, a test cycle involves conducting a simulated voice call conversation by calling a speech application and interacting with the speech application with spoken human utterances as a human would. The speech application may typically start the voice call conversation with an introductory welcome message and then proceed to ask the caller a purpose for contacting the speech application. Such a query by the speech application may elicit a response in form of an utterance from the caller. In an illustrative example, the speech application may be configured to welcome a user with a message 'Welcome to Air XYZ, How can we help you today?' Such a dialog prompt associated with an interaction node of the speech application requires a response from the user. Accordingly, at operation 506, the speech application may be executed until an interaction node requiring a response is encountered.

At operation 508, it is determined whether a stopping condition is encountered at the interaction node. As explained with reference to FIG. 3, the stopping condition may be one of an error event, an interaction transfer event, an interaction termination event and a goal realization event. In an illustrative example, the apparatus 300 (or more specifically the processor 302 of the apparatus 300) may be configured to determine if one of the interaction transfer event (for example, transfer of the voice call conversation from the speech application to a human interface, like an agent) or an interaction disconnect event (for example, upon exhaustion of new interaction nodes to test) is encountered at the interaction node, then the method 500 stops at operation 510. However, if it is determined that a stopping condition is not encountered at operation 508, then at operation 512, the apparatus 300 selects an utterance generation mode corresponding to the interaction node requiring a response. In an embodiment, the apparatus 300 is caused to select an utterance generation mode from one of a no-input mode; a matching input mode; and a non-matching input mode. In an embodiment, the selection of the utterance generation mode may be performed in a random manner. For example, each of the three input modes may first be assigned a numerical value. Thereafter, a numerical value may be randomly generated (for example, by using a random number generator), and an input mode whose assigned numerical value is closest to the randomly generated numerical value may be chosen to be the utterance generation mode. It is understood that such a random selection of the utterance generation mode is explained herein for illustrative purposes. Indeed, the utterance generation mode may be randomly selected in a variety of ways. Moreover, in at least some embodiments, the utterance generation mode may be selected in a non-random or a pseudo-random manner. For example, the three input modes may be selected as the utterance generation mode in turns sequentially (i.e., the no-input mode may be selected when a first instance of selection of an utterance generation mode is encountered, followed by selection of the matching-input mode and non-matching input mode for the second and third instances, respectively, with the cycle repeating for further instances of selection of utterance generation modes).

At operation 514, it is determined whether a 'no-input' mode is selected as the utterance generation mode. In an example embodiment, the no-input mode signifies a provisioning of a blank input, as the response. Accordingly, the apparatus 300 may be caused to not choose any spoken input or utterance as a response for the interaction node at operation 516. Such a blank input may be deliberately chosen to test the response of the speech application. Thereafter operations from operation 506 onwards may be performed in a repeated manner until a stopping condition is encountered at operation 508.

If it is determined that 'no-input' mode is not selected as the utterance generation mode, then it is determined whether the utterance generation mode is selected to be a matching input mode, at operation 518. If the utterance generation mode is not the matching input mode, then it is determined that the selected utterance generation mode is non-matching input mode.

It is noted that in case, the randomly selected utterance generation mode is one of the matching input mode or the non-matching input mode, then the apparatus 300 is caused to provide an utterance (i.e. spoken input) to meet the response requirement of the interaction node. The provisioning of the utterance to meet the response requirement of the interaction node is explained in further detail below:

In an example embodiment, the matching input mode signifies a provisioning of an utterance matching a speech application grammar associated with the interaction node as the response. To that effect, the apparatus 300 is configured to analyze the speech application grammar associated with the interaction node and generate a plurality of utterances based on the speech application grammar corresponding to the interaction node. In an illustrative example, a dialog prompt associated with the interaction node may be 'Welcome to Air XYZ, How can we help you today?' Such a dialog prompt associated with an interaction node of the speech application requires a response. The apparatus 300 may be caused to analyze the speech application grammar associated with the dialog prompt, i.e., translate the spoken utterance into a machine-usable interpretation form and based on the interpretation of the dialog prompt, a plurality of utterances is generated. In an illustrative example, a plurality of utterances, such as the utterance 'Please provide an arrival status of flight ABC123' may be generated by the apparatus 300 in response to analysis of the speech application grammar related to the dialog prompt 'Welcome to Air XYZ, How can we help you today?'.

In at least one example embodiment, each generated utterance may be associated with a weighted value. Based on the associated weighted values of respective utterances, the apparatus 300 may be caused to choose one utterance matching the speech application grammar as a response to the interaction node, at operation 520. The association of weighted values and the selection of the appropriate utterance are explained in further detail with reference to FIGS. 6 and 7. In an illustrative example, the apparatus 300 may be caused to choose a phrase utterance 'Please provide an arrival status of flight ABC123' as a response to the interaction node, as the phrase utterance is an appropriate match to the query posed by the speech application.

In an example embodiment, the non-matching input mode signifies a provisioning of an utterance not matching the speech application grammar associated with the interaction node as the response. More specifically, the apparatus 300 may be caused to analyze the speech application grammar of the dialog prompt and generate a plurality of utterances, which are not matching the speech application grammar of the dialog prompt. For example, for the dialog prompt 'Welcome to Air XYZ, How can we help you today?', the apparatus 300 may be caused to choose, at operation 522, a phrase utterance 'Please provide an arrival status of flight ABC123' as an utterance to the interaction node requiring a response, where the flight 'ABC123' does not match the speech application grammar (for example, the speech application grammar may include terms like 'XYZ123, XYZ789 and the like as corresponding flight identification numbers). Such a non-grammar matching utterance may be deliberately chosen to test the response of the speech application.

At operation 524, the chosen utterance, whether matching the speech application grammar or not, is converted into an equivalent speech form of input (i.e., the textual utterance is converted into an equivalent spoken form for example, by using an automatic speech recognition engine and associated natural language processing models) and at operation 526, the response corresponding to the interaction node is provided to the speech application to continue the dialogue with the speech application. The operations 506-526 may be performed in a repeated manner until a stopping condition is encountered at operation 508.

In an embodiment, the apparatus 300 is caused to capture information related to interaction nodes traversed (i.e., a listing of all interaction nodes interacted with) during the voice call interaction, associated dialog prompts, the responses (for example, utterances or a blank input) provided to the speech application and the like, and configure a test script including a set of instructions for reproducing the test cycle results. It is noted that each such a test cycle may be executed with an aim to determine validity of responses provided by the speech application and as such a variety of utterances (including those supplied by humans or those which are system generated) may be provided to the speech application and corresponding results stored as test scripts.

Further, as explained with reference to FIG. 3, the apparatus 300 may be caused to execute multiple test cycles until adequate test coverage (for example, testing of a target number of interaction nodes etc.) is achieved and/or until a pre-defined limit, such as for example a maximum of test runs/cycles, is reached. The processor 302 is configured to store test scripts that allow reproduction of test steps/inputs that capture utterances and other inputs in the memory 304. In an example embodiment, the processor 302 may store test scripts using some pre-defined criteria, such as for example (1) store the test scripts corresponding to all test cycles, (2) store only those test cycles for which errors are detected, (3) store only those test cycles which are associated with maximum test coverage, (4) store test scripts that are associated with traversing a specific interaction node, (5) store test scripts that are associated with a particular locale (for example, test scripts associated with US English language usage) or alternatively, store test scripts that do not use a particular locale, and (6) store test scripts that use a specific utterance, such as an utterance like "make reservation" for instance, and the like.

Referring back to FIG. 3, in an example embodiment, the processor 302 is configured to, with the content of the memory 304, cause the apparatus 300 to score the plurality of test scripts based at least in part on a number of interaction nodes of the speech application traversed (i.e. tested) during the course of respective voice call interaction and a number of steps involved in traversing the number of interaction nodes. Each test script is associated with a respective score upon scoring of the plurality of tests scripts. More specifically, each test script may be assigned a value (numerical or otherwise), which serves as measure of utility of the test script. For example, a test script that facilitates testing of more number of interaction nodes with least number of steps may be associated with a higher numerical score than a test script that covers an equal or less number of interaction nodes with more number of steps. For example, a test script that facilitates traversal or testing of ten interaction nodes with five steps may be associated with a higher numerical score than a test script that covers eight interaction nodes with seven steps. In an example embodiment, the apparatus 300 may be caused to rank the plurality of test scripts based on the respective score of the each test script.

In an embodiment, the processor 302 is configured to, with the content of the memory 304, cause the apparatus 300 to identify one or more test scripts from among the plurality of test scripts based on a pre-determined objective. In an illustrative example, the pre-determined objective may relate to identifying a minimal number of top-ranking test scripts configured to cumulatively facilitate testing of a maximum number of interaction nodes from among the network of interaction nodes of the speech application. For example, instead of providing a user with a highest ranked test script which optimally covers interaction nodes 1, 2 and 3, followed by a subsequently ranked test script that optimally covers interaction nodes 1, 2, 3 and 4, the apparatus 300 may choose to provide a highest ranked test script, which optimally covers interaction nodes 1, 2 and 3 followed by a highest ranked test script that optimally covers interaction nodes 4, 5 and 6, in effect increasing the test coverage with a minimal number of test scripts.

Accordingly, the apparatus 300 may be caused to rank the test scripts based on the associated scores and provide a user with a minimal number of top ranking test scripts that cover a maximum number of the interaction nodes of a speech application to be tested. Such a provisioning of test scripts makes it easier for the user involved in testing of a speech application to focus on a small set of test scripts to verify the speech application and thereby manage testing efforts. Moreover, the user is also spared the time-consuming exercise of identifying the best scripts for testing of his/her speech application while ensuring adequate coverage.

In an embodiment, the processor 302 in conjunction with the memory 304 is configured to cause the apparatus 300 to provide the one or more identified test scripts to a user for facilitating a testing of the speech application. The provisioning of the test scripts is further explained with reference to an example scenario: Consider that 100 test scripts were generated during a test run and the 100 test scripts cover 20 interaction nodes. Further, the 100 test scripts include ten error scripts (i.e. test scripts in which errors are detected) and the ten error scripts cover five interaction nodes. In such a scenario, the apparatus 300 may be caused to score each of the 100 test scripts and provision the test scripts based on the pre-determined objective. More specifically, the test scripts associated with higher scores and which efficiently cover all the interaction nodes may be provisioned to the user higher in the order. Furthermore, in some example scenarios, the user may wish to review the error test scripts. In the above example scenario involving ten error scripts covering five interaction nodes, the apparatus 300 may be caused to take into account the scores associated with each of ten error scripts and provision the ten error scripts to the user in an order that ensures efficient coverage of all five interaction nodes. For example, in a first cycle, an error script covering nodes 1, 2 and 3 may be provisioned followed by an error script covering nodes 1, 4 and 5. Furthermore, in a subsequent cycle, an error script covering nodes 1 and 2 may be followed by error scripts covering nodes 1 and 5 and 1, 4, 4, 4, 5, 5, 5 and 1, respectively and so on and so forth, in effect increasing the test coverage with minimal number of test scripts.

In many example scenarios, users may request information from the speech application for which appropriate responses are not readily available with the speech application. To that effect, the speech application may be integrated with external applications (also referred to herein as external integration services) for retrieving information relevant to the user's request. In an illustrative example, the speech application may correspond to an IVR application of an airline flight reservation system. Accordingly, the speech application may be configured to welcome a user with a message 'Welcome to Air XYZ, How can we help you today?' Further, upon receiving a response, such as for example, 'I want to book a flight to Hawaii for tomorrow', the speech application may be configured to 'lookup' for airline seat availability from an external integration service related to the airline flight reservation system to provide suitable options to the user. In another illustrative example, a speech application deployed at a customer support facility related to a banking service may be integrated with a remote banking application to retrieve information, such as for example, information related to available funds in a user's account, latest banking transaction, user's personal identification information and the like. During an on-going interaction with a user, the speech application may call upon an external integrated service and receive appropriate information from the external integrated service. In an embodiment, the processor 302 in conjunction with the memory 304 may cause the apparatus 300 to intercept an invoking of an external integration service by the speech application. The apparatus 300 is further caused to track an outgoing request from the speech application to the external integration service, and an incoming response from the external integration service to the speech application, upon invoking of the external integration service by the speech application.

In at least one example embodiment, the apparatus 300 may be caused to provide integration service responses at usable invocation points to the speech application. For example, the apparatus 300 is caused to feed a programmatically supplied response (for example, a machine learnt response) to the speech application, for at least one outgoing request for information from the speech application to the external integration service, rather than actually invoking an actual external integration service. In an embodiment, for a given interaction node, the apparatus 300 may choose a previously observed response at random or use a pre-defined criteria to generate a response using a specific process or allow human-provided responses to be used. Such an approach provides a plurality of benefits. For example, such an approach may enable the speech application to avoid loading an external integration service excessively. Further, human-provided responses enable the apparatus 300 to focus testing on specific areas of the speech application. Moreover, such an approach allows testing of valuable scenarios that would not otherwise be tested. For example, if an integration service allows variable length account numbers between five and ten digits, but only ten digit account numbers are available in test data, then by randomly choosing previous valid integration service responses for ten digit account numbers, and using them after using an utterance with a five digit account number, the five digit number behavior can be easily tested in a way that was not otherwise possible.

As explained with reference to FIG. 4, the apparatus 300 is caused to analyze the speech application grammar associated with the dialog prompt (for an interaction node requiring a response) and generate a plurality of utterances. Further, each generated utterance is associated with a weighted value. Based on the associated weighted values of respective utterances, the apparatus 300 may be configured to choose one utterance matching the speech application grammar as a response to the interaction node. In an embodiment, the processor 302 of the apparatus 300 is configured to assign weighted values to respective utterances based on historically observed behavior of the speech application upon provisioning of the respective utterances to the speech application. More specifically, the processor 302 is configured to consider the past behavior of the speech application when a potential utterance was used and based on the past behavior or such other criteria associate a weighted value with an utterance. For example, if a 'go back' utterance consistently goes to a previously visited node, it may be assigned a lower weighted value because it does not progress the interaction to a new area of the speech application that increases the tested area of the speech application. In some example scenarios, certain human-configured global or node-specific utterances, such as numerical codes for example, may be similarly associated with low weighted values. In an example embodiment, the processor 302 is configured to consider multiple utterances and their respective values and exhibit a preference toward higher-weighted utterances.

In an embodiment, the processor 302 of the apparatus 300 is also configured to track associations between the utterances based on their interpretations. For example, the processor 302 is configured to treat two distinct utterances that produce the same interpretation to be equivalent utterances, for weighing and other purposes. In an illustrative example, the utterances 'check my balance' and 'check balance' yield the same interpretation and accordingly may be associated with equivalent weighted values. The weighing of utterances is further explained with reference to FIG. 6.

Figure 6:
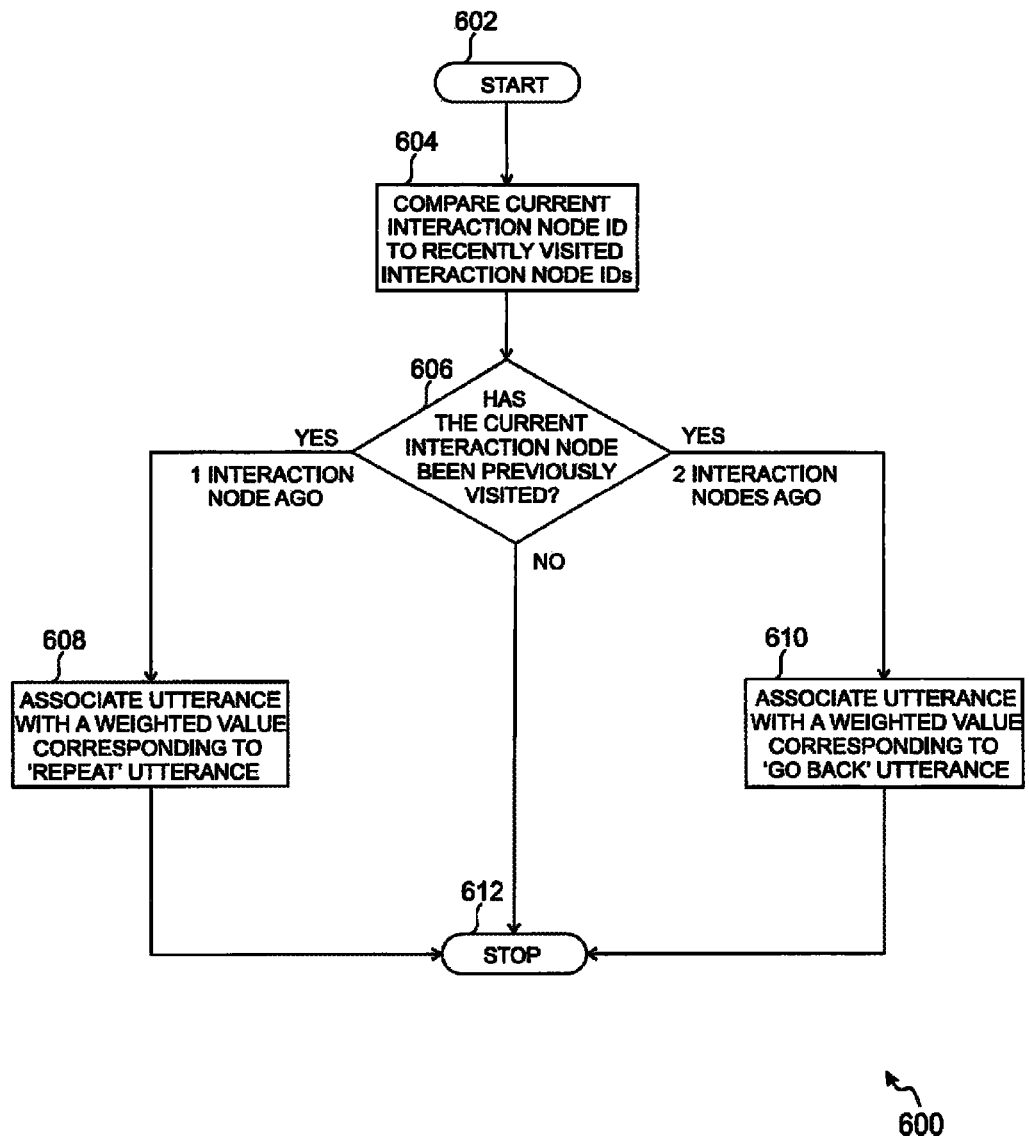
FIG. 6 is a flow diagram of a method illustrating an example weighing of utterances by the apparatus of FIG. 3, in accordance with an embodiment of the invention.

FIG. 6 is a flow diagram of a method 600 illustrating an example weighing of utterances by the apparatus 300 in accordance with an embodiment. As explained with reference to FIGS. 3 and 4, utterances provided to the speech application may advance the interaction to new interaction nodes. The method 600 starts at operation 602 when a specific point in the interaction with the speech application is reached. The specific point in the interaction may correspond to any point in the interaction precluding the initial point in the interaction associated with the top or the first interaction node from among the network of interaction nodes of the speech application. At operation 602, information related to current interaction node ID is retrieved by the processor 302 from the memory 304.

At operation 604, current interaction node ID is compared to recently visited interaction node IDs. At operation 606, it is determined if the current interaction node is previously visited or not. If it is determined that the current interaction node is previously visited one interaction node ago, then operation 608 is performed. At operation 608, a weighted value corresponding to the 'Repeat' utterance is associated with the utterance resulting into furthering the interaction to the current interaction node. If it is determined that the current interaction node is previously visited two interaction nodes ago, then operation 610 is performed. At operation 610, a weighted value corresponding to the 'Go back' utterance is associated with the utterance resulting into furthering the interaction to the current interaction node. In an example embodiment, the weighted values corresponding to the 'Go back' and the 'Repeat' utterances are associated with low values as these utterances do not progress the testing of the speech application to new interaction nodes. If the current interaction node was not previously visited, then the utterance resulting into furthering the interaction to a new interaction node (for example, the current interaction node) may be associated with higher weighted value as the utterance progresses the interaction with the speech application to new interaction nodes thereby increasing the test coverage. It is noted that a weighted value is not associated with an utterance at a first occurrence of a 'go back' behavior exhibited by the utterance. However, upon one or more such detections of a 'go back' behavior with the utterance, a weighted value (for example, a low weight value) may be associated with the utterance. Further, as explained with reference to FIG. 3, the processor 302 is configured to take a historically observed behavior of an utterance into account while associating a weighted value with the utterance. For example, if an utterance results in a go back behavior in only some of the instances (whereas in other instances lead to different nodes), then a weighted value may be associated with the utterance based on the specific proportion of 'go back' behavior and 'non go back' behavior. It is also noted that the processor 302 is configured to associate equivalent weighted values with utterances having similar interpretations, such as for example, utterances like 'check my balance' and 'check balance' are associated with similar weights. The method 600 stops at operation 612. The selection of an utterance matching speech application grammar is explained hereinafter with reference to FIG. 7.

Figure 7:
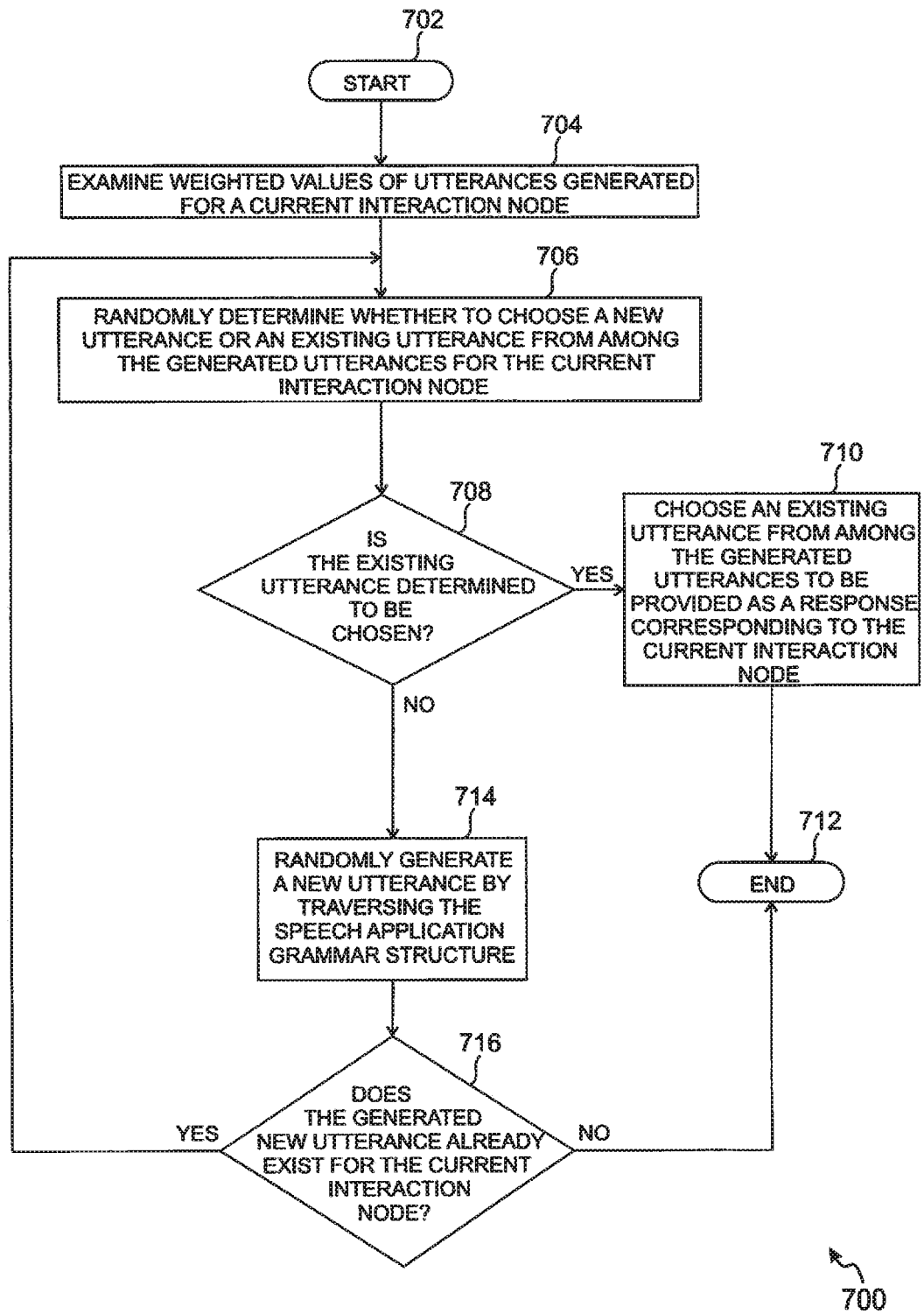
FIG. 7 is a flow diagram of a method illustrating an example choosing of an utterance by the apparatus of FIG. 3 for providing the utterance as a response corresponding to the interaction node of the speech application, in accordance with an embodiment of the invention.

FIG. 7 is a flow diagram of a method 700 illustrating an example choosing of an utterance by the apparatus 300 for providing the utterance as a response corresponding to the interaction node of the speech application in accordance with an embodiment of the invention. As explained with reference to FIG. 5, upon encountering an interaction node requiring a response, the apparatus 300 is caused to select an utterance generation mode from among a no-input mode, a matching input mode and a non-matching input node. The method 700 corresponds to determination of an utterance to be provided as a response upon selection of the matching input mode as the utterance generation mode. Further, as explained with reference to FIG. 5, upon selection of the matching input mode as the utterance generation mode, the processor 302 is configured to analyze the speech application grammar and generate weighted utterances related to the speech application grammar. The method 700 starts at operation 702 upon selection of the matching input mode as the utterance generation mode.

At operation 704, the weighted values of the utterances generated for a current interaction node are examined. At operation 706, a random determination of whether to choose a 'new utterance' or an 'existing utterance' is performed. More specifically, the processor 302 randomly determines whether to choose an utterance from among the generated weighted utterances for the current interaction node, i.e. choose an existing utterance, or instead, to generate a new utterance by traversing the speech application grammar for various interaction nodes.

At operation 708, it is determined whether an existing utterance is determined to be chosen. If yes, then at operation 710, an existing utterance from among the utterances generated for the current interaction node is chosen to be provided as a response corresponding to the current interaction node. In some embodiments, the processor 302 may be configured to choose an utterance associated with the highest weighted value from among the generated utterances for provisioning the response. The method 700 stops at 712.

If it is determined that the existing utterance is not determined to be chosen at 708, implying a choice of a new utterance, then at operation 714, a new utterance is randomly generated by traversing the speech application grammar structure. At operation 716, it is determined whether the generated new utterance already exists among the generated utterances for the current interaction node or not. If the new utterance does not exist among the generated utterances for the current interaction node, then the new utterance is chosen to be provided as the response corresponding to the current interaction node. If the new utterance exists among the generated utterances for the current interaction node, then operations 706-712 are repeated until an utterance not previously associated with the interaction node is chosen. The method 700 ends at operation 712. At 712, the existing and/or the new utterance may be converted into an equivalent speech form and provided as the response corresponding to the interaction node. The random determination of choosing an existing utterance or a new utterance is further explained with reference to an illustrative example: Consider an interaction node associated with a prompt 'Please enter your account number' that had previously been visited several times, and had thus produced several utterances with weighted values as follows: 'go back'=0.1, 'repeat'=0.1, '12345'=10, '00000'=0 and '19482'=−1. The utterance '19482' has a weighted value of −1, which serves as a special marker indicating that the respective utterance should not participate in weighing, so the weight is not considered herein. Initially, all weighted values that are >=0 are added to generate the sum 10.2. Next, a specially chosen weight (for example, an empirically determined weight) is added which represents the relative probability of generating a new utterance, instead of using an existing one. In an example scenario, a value '1.0' may be used to represent such a weight. The total sum of weighted values now adds up to 11.2. Finally, a random number R is generated between 0 and 11.2. The value of R is considered relative to individual components of the weighted values. If the value of R is in the range of 0 to 0.1, then the 'go back' utterance is used. If the value of R is in the range of 0.1 to 0.2, then 'repeat' utterance is used. If the value of R is in the range of 0.2 to 10.2, then '12345' utterance is used. If the value of R is in the range of 10.2 to 11.2, then a new utterance is generated. In such an example scenario, a 10/11.2, i.e. 89% chance exists of using an existing utterance '12345', and about a 1/11.2, i.e. 9% chance that a new utterance will be selected instead of using an existing utterance. Further, if a new utterance is generated, then it is compared to the existing weighted utterances. If the new utterance matches an existing utterance with weighted value >=0, then it is not used (in this case, "go back", "repeat", "12345", "00000"). It is understood that the above example is included herein for illustration purposes and should not be considered limiting.

Indeed various such computations may be designed for determining the randomly choosing the utterance.

Referring back to FIG. 3, in an embodiment, the processor 302 is configured to maintain a log of utterances capable of progressing the voice call interaction from a chosen interaction node to another interaction node from among the network of interaction nodes of the speech application. More specifically, the processor 302 in conjunction with the memory 304 is configured to record statistics related to visited interaction nodes, such as for example node ID, associated dialog prompts, previous responses etc., as well as utterances that have historically caused the speech application to move between two specific interaction nodes. Such information allows assessing how many speech application interaction nodes have been tested which may, in turn, influence on how the processor 302 prioritizes and selects potential utterances. Further, the processor 302 is configured to track system time and such other variable parameters that influence execution and the tracked parameters may be replayed with the test scripts. The processor 302 may also be configured to supply reports and determine which set of test scripts most effectively achieve a broad testing of the speech application.

In an embodiment, the processor 302 is configured to analyze logs, reports, or other source of data, to determine utterances and/or external integration service responses that have actually been observed in use by external systems, real users, testers and the like. In an embodiment, the processor 302 is configured to analyze the speech application to determine coverage of testing interaction nodes associated with the speech application. For example, the processor 302 may determine that a certain interaction node is capable of flowing to another specific interaction node with the right combination of utterance/outside data, and that such a path has not yet been tested. The processor 302 may further focus efforts on reaching the untested interaction nodes, in order to achieve maximum coverage. In an embodiment, the processor 302 is configured to automatically file bugs (for example, coding errors or any such errors) in a bug tracking system upon detecting an error during testing of the speech application. Further, the processor 302 is configured to allow diffing between two versions of a speech application and thereafter generate a report highlighting the changes between the two versions. In an embodiment, the processor 302 is configured to run multiple concurrent test cycles, thus execute load testing of the speech application. Each test cycle may use the same utterances and/or same test script or different utterances/test scripts for testing purposes.

In an embodiment, the memory 304 is configured to store the utterances, the outgoing requests and incoming responses for each invocation of the external integration service, the programmatic responses to the speech application from the processor 302, statistics about the interaction nodes from the processor 302, the reports, the test scripts, scores associated with test scripts, and the like. In an embodiment, the grammar related to the speech application may also be stored in the memory 304. More specifically, the memory 304 is configured to store a list of rules citing words and phrases to be identified in the spoken input specific to the speech applications. In an embodiment, the memory 304 is configured to store recorded human speech in addition to (or in place of) generated textual utterances. The processor 302 may retrieve the stored grammar specific to the speech application and examine existing weighted utterances for a current node and select an utterance generation mode as explained with reference to FIG. 5. In an embodiment, the processor 302 is configured to select a human-supplied valid utterance (for example, an utterance provided by a human tester or a developer) corresponding to the specific interaction point. In scenarios where a large set of possible utterances exists and only a small number of utterances therein produce meaningful behavior, the processor 302 may choose either a human-supplied valid utterance or a purely random one. In an embodiment, the processor 302 may, in some or all cases sequentially traverse all possible utterance combinations while precluding random selection of utterances altogether. In some embodiments, the processor 302 is configured to generate variable confidence level utterances, and/or can generate priority lists of multiple utterances, for a specific grammar. The utterances generated by the processor 302 are converted into recognizable speech form and are subsequently provided to the speech application. A method for speech application testing is explained with reference to FIG. 8.

Figure 8:
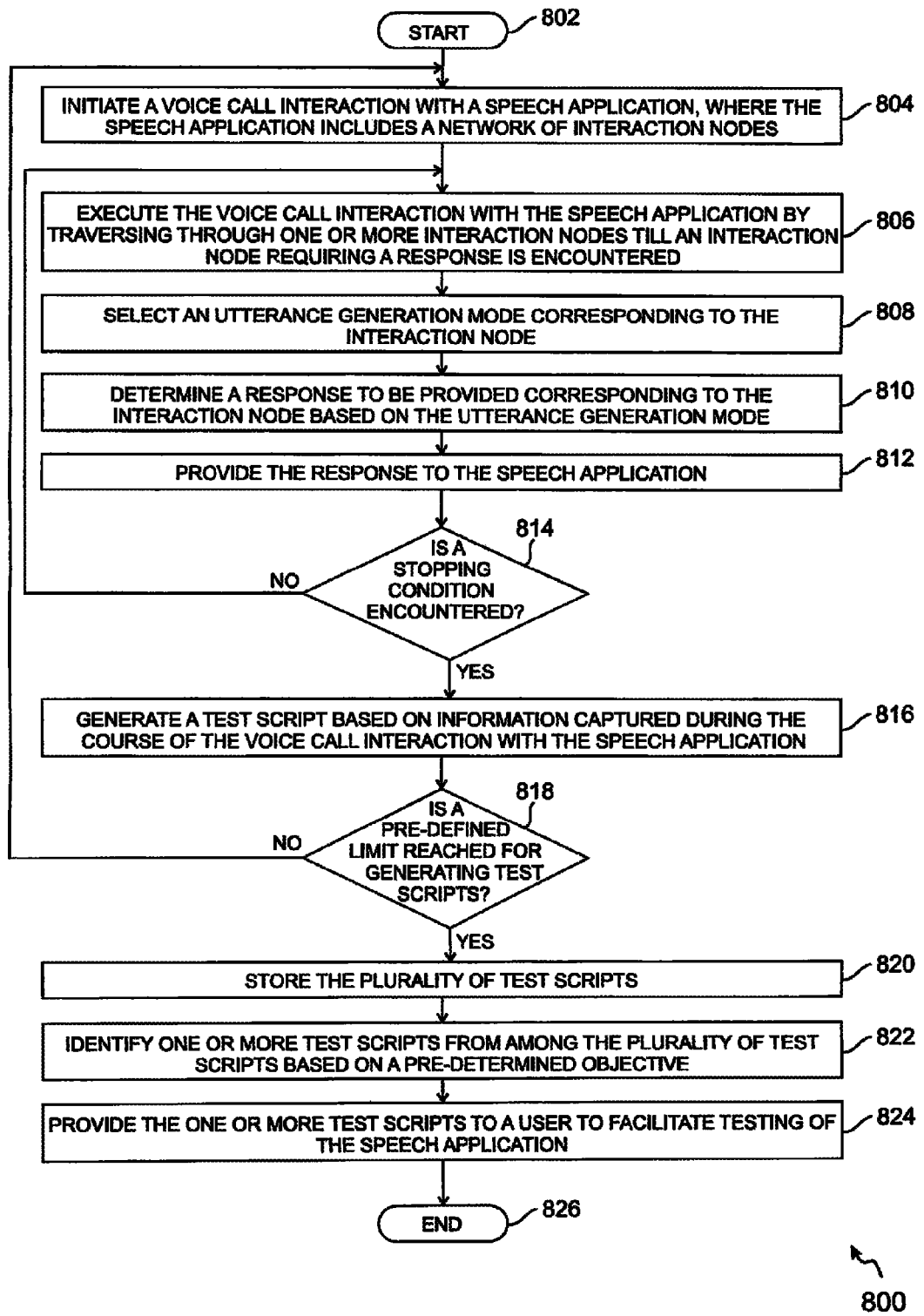
FIG. 8 is a flow diagram of an example method for facilitating testing of a speech application, in accordance with an embodiment of the invention.

FIG. 8 is a flow diagram of an example method 800 for facilitating testing of a speech application, in accordance with an embodiment of the invention. The method 800 depicted in the flow diagram may be executed by, for example, the apparatus 300 explained with reference to FIGS. 3 to 7. Operations of the flowchart, and combinations of operation in the flowchart, may be implemented by, for example, hardware, firmware, a processor, circuitry and/or a different device associated with the execution of software that includes one or more computer program instructions. The operations of the method 800 are described herein with help of the apparatus 300. For example, one or more operations corresponding to the method 800 may be executed by a processor, such as the processor 302 of the apparatus 300. It is noted that although the one or more operations are explained herein to be executed by the processor alone, it is understood that the processor is associated with a memory, such as the memory 304 of the apparatus 300, which is configured to store machine executable instructions for facilitating the execution of the one or more operations. It is also noted that, the operations of the method 800 can be described and/or practiced by using an apparatus other than the apparatus 300. The method 800 starts at operation 802. At operation 802 of the method 800, the speech application is deployed in a test environment for facilitating testing of the speech application.

At operation 804 of the method 800, a voice call interaction is initiated with a speech application. The speech application includes a network of interaction nodes as explained with reference to FIG. 1. At operation 806 of the method 800, the voice call interaction with the speech application is executed by traversing through one or more interaction nodes from among the network of interaction nodes until an interaction node requiring a response is encountered.

At operation 808 of the method 800, an utterance generation mode corresponding to the interaction node is selected. The utterance generation mode is randomly selected from one of a no-input mode, a matching input mode and a non-matching input mode. As explained with reference to FIG. 5, the no-input mode signifies a provisioning of a blank input as the response; the matching input mode signifies a provisioning of an utterance matching a speech application grammar associated with the interaction node as the response; and the non-matching input mode signifies a provisioning of an utterance not matching a speech application grammar associated with the interaction node as the response.

At operation 810 of the method 800, a response to be provided corresponding to the interaction node is determined based on the utterance generation mode. As explained with reference to FIG. 5, a blank input may be provisioned upon selection of the no-input mode as the utterance generation mode, whereas upon selection of any of the matching input mode or the non-matching input mode, a speech application grammar associated with the interaction node may be analyzed and a plurality of utterances may be generated. Each utterance from among the plurality of utterances is associated with a weighted value. As explained with reference to FIG. 5, the weighted values are assigned to respective utterances based on historically observed behavior of the speech application upon provisioning of the respective utterances to the speech application. Further, associations among the plurality of utterances may be identified and tracked based on respective interpretations of the plurality of utterances. In an embodiment, an utterance to be provided as the response is chosen based on the respective weighted values associated with the plurality of utterances. The utterance may be chosen from among the plurality of utterances, i.e. existing utterances, or the utterance may be chosen not from the generated utterances, but instead a new utterance may be generated by traversing the speech application grammar structure. In an embodiment, the plurality of utterances includes at least one human-supplied valid utterance. The determination of the response (whether a blank input, an existing utterance or a new utterance or even an utterance not matching the speech application grammar may be performed as explained with reference to FIG. 5 and is not explained herein.

At operation 812 of the method 800, the response is provided to the speech application. In an embodiment, the chosen utterance is converted into an equivalent speech form of input prior to provisioning of the utterance as the response corresponding to the interaction node.

At operation 814 of the method 800, it is determined whether a stopping condition is encountered. In an embodiment, the stopping condition is one of an error event, an interaction transfer event, an interaction termination event and a goal realization event. If the stopping condition is not encountered at operation 814, then operations 806, 808, 810, 812 and 814 are repeated until a stopping condition is encountered at operation 814. At operation 816 of the method 800, a test script is generated based on information captured during the course of the voice call interaction with the speech application. At operation 818 of the method 800, it is determined whether a pre-defined limit for generation of test scripts is reached or not. If it is determined that the pre-defined limit for generation of test scripts is not reached then operations 802 to 818 are repeated until a pre-defined limit for generation of test scripts is achieved. At operation 820 of the method 800, a plurality of test scripts is stored.

At operation 822 of the method 800, one or more test scripts are identified from among the plurality of test scripts based on a pre-determined objective. In an embodiment, the plurality of test scripts are scored based at least in part on a number of interaction nodes of the speech application traversed during the course of respective voice call interaction and a number of steps involved in traversing the number of interaction nodes. Accordingly, each test script is associated with a respective score upon scoring of the plurality of tests scripts. Further, the plurality of test scripts is ranked based on the respective score of the each test script. In an embodiment, identifying the one or more test scripts based on the pre-determined objective relates to identifying a minimal number of top ranking test scripts configured to cumulatively facilitate testing of a maximum number of interaction nodes from among the network of interaction nodes of the speech application. At operation 824 of the method 800, the one or more test scripts are provided to the user to facilitate testing of the speech application. The method 800 ends at operation 826. At operation 826, the user may initiate testing of the speech application based on the identified one or more test scripts. Furthermore, at operation 826, a log of utterances capable of progressing the voice call interaction from a chosen interaction node to another interaction node from among the network of interaction nodes of the speech application is recorded and maintained.

Without in any way limiting the scope, interpretation, or application of the claims appearing below, advantages of one or more of the exemplary embodiments disclosed herein include enabling testing of the speech applications with minimal human intervention regardless of speech application design changes and/or changes to integration of external applications. Various embodiments disclosed herein provide numerous advantages. The techniques disclosed herein may be used to generate multiple test scripts (for a variety of utterances and other inputs) and a user may be able to choose appropriate test scripts given his/her specific requirement for testing of speech applications. For example, the user may utilize test scripts for both 'flight delayed' and 'flight not delayed' scenarios to test speech applications related to airline flight reservation system. Moreover, the user may be able to choose test scripts that provide comprehensive coverage (for example, test scripts adequately covering all the interaction nodes) or test scripts that target specific areas of the speech application based on his/her requirements. As described above, the methods and apparatuses disclosed herein provide a minimal set of test scripts that are configured to optimally cover testing of a maximum number of interaction nodes in a speech application. Such a provisioning of test scripts makes it easier for a user to focus on a small set of test scripts to verify the speech application and thereby manage testing efforts. Moreover, the user is also spared the time-consuming exercise of identifying the best test scripts for testing of his/her speech application while ensuring adequate coverage. The speech applications may correspond to applications hosted on web servers and accessed remotely by a user, or, applications pre-installed (or downloaded from an application store) in a communication device and which are configured to be responsive to voice commands.

The test scripts as generated herein preclude cross-referencing of multiple documents or analyzing of complex grammar to identify, which spoken utterances resulted in specific actions. Moreover, the test scripts, as generated herein are usable across multiple iterations regardless of design changes to the speech application. Further, techniques disclosed herein enable users to circumvent concerns related to integration of external applications, thereby enabling seamless and reliable testing of speech applications. As such, techniques disclosed herein facilitate testing of speech applications with maximal coverage of the speech applications and minimum human intervention.

In some embodiments, the suggested techniques may be used for testing of non-speech applications. For example, a web page with clickable links may be considered analogous to a speech application, like an IVR application with grammar. Similarly, a journey involving several web pages maybe considered equivalent to an IVR experience of navigating through multiple menus. Moreover, filling out a form including multiple fields (for example username/password), may be similar to an IVR asking for username/password. Another example of a non-speech application may be an application configured to facilitate spoken or typed chat conversations. For example, a chat conversation between a customer and a chatbot (for example, an automated chat agent) may involve various stages with corresponding grammar like a greeting stage, a concern identification stage, a solution rendering stage and the like, which may be considered analogous to interaction nodes of a speech application. Moreover, a dialog prompt associated with each chat interaction stage may be analogous to a dialog prompt associated with an interaction node of the speech application. In at least one example embodiment, dialog prompts and associated chat application grammar (for generating machine-usable interpretation of dialog prompts) of various stages of the chat application may be analyzed and an input response mode may be selected. Thereafter, suitable spoken or typed responses (i.e., utterances) may be chosen based on selected input response mode and provided to test the interactive chat applications. It is understood that necessary adjustments (in terms of grammar and utterances) may be made in such cases for facilitating testing of such non-speech applications.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 300, the processor 302, the memory 304 and the I/O module 306 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 4 to 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
executing, by a processor, a test cycle for generating a test script, the test script generated by performing:
initiating a voice call interaction with a speech application, the speech application comprising a network of interaction nodes; and
repeatedly performing, until a stopping condition is encountered, the steps of:
executing the voice call interaction with the speech application by traversing through one or more interaction nodes from among the network of interaction nodes until an interaction node requiring a response is encountered;
selecting an utterance generation mode corresponding to the interaction node;
determining a response to be provided corresponding to the interaction node of the speech application based on the utterance generation mode; and
providing the response to the speech application,
wherein the test script comprises instructions for traversing interaction nodes involved during a course of the voice call interaction, and, instructions for provisioning one or more responses to the speech application during the course of the voice call interaction; and
facilitating, by the processor, testing of the speech application using the test script.

2. The method of claim 1, wherein the speech application is a voice assistant application associated with a communication device.

3. The method of claim 2, wherein the communication device is one a mobile phone, a smartphone, a wearable device, a tablet personal computer, a personal digital assistant, a laptop computer and a desktop computer.

4. The method of claim 1, wherein the stopping condition is one of:
an error event comprising detection of at least one error during the execution of the voice call interaction;
an interaction transfer event comprising detection of a transfer of the voice call interaction to a customer support representative;

an interaction termination event comprising detection of a termination of the voice call interaction; and a goal realization event comprising detection of a realization of a pre-determined goal for testing of the speech application.

5. The method of claim 4, wherein the pre-determined goal for testing of the speech application is one of:

a test coverage goal related to ensuring maximum coverage of interaction nodes of the speech application during testing of the speech application;

a goal related to reaching a specific interaction node from among the network of interaction nodes using least number of interaction steps; and a logged error identification goal related to reproducing a specific error.

6. The method of claim 1, further comprising:

storing the test script as a test cycle result, wherein the test cycle result is stored as a part of at least one pool of test cycle results from among a plurality of pools of test cycle results based on a commonality in pattern between the test cycle result and test cycle results configuring the at least one pool of test cycle results.

7. The method of claim 6, wherein the plurality of pools of test cycle results comprise at least one of:

a logged error pool comprising test cycle results associated with a specific logged error;

a node related pool comprising test cycle results involving traversal of a specific interaction node;

an assorted pool comprising one or more test cycle results with no commonality of pattern in corresponding test scripts.

8. The method of claim 1, further comprising:

executing, by the processor, a plurality of test cycles for generating a plurality of test scripts, wherein the plurality of test cycles are executed until a pre-determined test coverage is achieved or a pre-defined limit is reached.

9. A computer-implemented method, comprising:

executing, by a processor, a test cycle for generating a test script, the test script generated by performing:

initiating a voice call interaction with an interactive voice response (IVR) application, the IVR application comprising a hierarchy of interaction nodes; and repeatedly performing, until a stopping condition is encountered, the steps of:

executing the voice call interaction with the IVR application by traversing through one or more interaction nodes from among the hierarchy of interaction nodes until an interaction node requiring a response is encountered;

selecting an utterance generation mode corresponding to the interaction node;

determining a response to be provided corresponding to the interaction node of the speech application based on the utterance generation mode; and providing the response to the IVR application, wherein the test script comprises instructions for traversing interaction nodes involved during a course of the voice call interaction, and, instructions for provisioning one or more responses to the IVR application during the course of the voice call interaction; and facilitating, by the processor, testing of the IVR application using the test script.

10. The method of claim 9, wherein the stopping condition is one of:

an error event comprising detection of at least one error during the execution of the voice call interaction;

an interaction transfer event comprising detection of a transfer of the voice call interaction to a customer support representative;

an interaction termination event comprising detection of a termination of the voice call interaction; and a goal realization event comprising detection of a realization of a pre-determined goal for testing of the IVR application.

11. The method of claim 9, wherein the utterance generation mode is selected from one of:

a no-input mode, the no-input mode signifying a provisioning of a blank input as the response;

a matching input mode, the matching input mode signifying a provisioning of an utterance matching an IVR application grammar associated with the interaction node as the response; and a non-matching input mode, the non-matching input mode signifying a provisioning of an utterance not matching the IVR application grammar associated with the interaction node as the response.

12. The method of claim 11, further comprising performing, by the processor, upon selection of the matching input mode:

analyzing the IVR application grammar associated with the interaction node;

generating a plurality of utterances based on the IVR application grammar corresponding to the interaction node, the plurality of utterances associated with respective weighted values; and choosing the utterance to be provided as the response to the IVR application based on the respective weighted values associated with the plurality of utterances.

13. The method of claim 12, wherein the utterance is chosen from among the plurality of utterances generated based on the IVR application grammar corresponding to the interaction node.

14. The method of claim 12, wherein the utterance is chosen to be a new utterance precluding the plurality of utterances generated based on the IVR application grammar.

15. The method of claim 12, wherein the plurality of utterances comprises at least one human-supplied valid utterance.

16. The method of claim 9, further comprising:

intercepting, by the processor, an invoking of an external integration service by the IVR application; and tracking, by the processor, an outgoing request from the IVR application to the external integration service, and an incoming response from the external integration service to the IVR application, upon invoking of the external integration service by the IVR application.

17. The method of claim 12, further comprising:

providing, by the processor, a programmatically generated response to at least one outgoing request from the IVR application to the external integration service upon invoking of the external integration service by the IVR application.

18. An apparatus, comprising:

at least one processor; and a memory having stored therein machine executable instructions, that when executed by the at least one processor, cause the apparatus to:

initiate a voice call interaction with a speech application, the speech application comprising a network of interaction nodes;

execute the voice call interaction with the speech application by traversing through one or more interaction nodes from among the network of interaction nodes until an interaction node requiring a response is encountered;

provide simulated speech utterances as the response to the speech application;

repeatedly perform the steps of executing the voice call interaction and providing the simulated speech utterances, until a stopping condition is encountered;

generate a test script comprising instructions for traversing interaction nodes involved during a course of the voice call interaction, and, instructions for provisioning one or more simulated speech utterances to the speech application during the course of the voice call interaction; and facilitate testing of the speech application using the test script.

19. The apparatus of claim 18, wherein the simulated speech utterances are configured to simulate realistic human speech with spoken accents matching expected user usage.

20. The apparatus of claim 18, wherein the simulated speech utterances are associated with one or more human languages.

\* \* \* \* \*